United States Patent
Fireaizen

(10) Patent No.: US 8,229,472 B2
(45) Date of Patent: *Jul. 24, 2012

(54) SYSTEM AND METHOD FOR ENABLING DETERMINATION OF A POSITION OF A TRANSPONDER

(75) Inventor: Moshe Fireaizen, Halamish (IL)

(73) Assignee: Elta Systems Ltd., Ashdod (IL)

( * ) Notice: Subject to any disclaimer, the term of this patent is extended or adjusted under 35 U.S.C. 154(b) by 585 days.

This patent is subject to a terminal disclaimer.

(21) Appl. No.: 11/989,478

(22) PCT Filed: Jul. 25, 2006

(86) PCT No.: PCT/IL2006/000861

§ 371 (c)(1),
(2), (4) Date: Apr. 20, 2009

(87) PCT Pub. No.: WO2007/013069

PCT Pub. Date: Feb. 1, 2007

(65) Prior Publication Data

US 2010/0001896 A1 Jan. 7, 2010

(30) Foreign Application Priority Data

Jul. 25, 2005 (IL) .......................... 169854

(51) Int. Cl.
*H04W 24/00* (2009.01)
*H04M 1/00* (2006.01)
*G01S 13/74* (2006.01)
*G01S 1/24* (2006.01)

(52) U.S. Cl. ............... 455/456.4; 455/456.1; 455/562.1; 342/42; 342/387

(58) Field of Classification Search ............... 455/456.1, 455/456.2, 456.3, 456.5, 456.6, 562.1; 342/42, 342/387, 394

See application file for complete search history.

(56) References Cited

U.S. PATENT DOCUMENTS

| | | | |
|---|---|---|---|
| 3,946,385 A | 3/1976 | Ewen | |
| 3,967,277 A | 6/1976 | Hastings et al. | |

(Continued)

FOREIGN PATENT DOCUMENTS

DE 28 43 253 A1 4/1980

(Continued)

OTHER PUBLICATIONS

"VHF omni directional range" Wikipedia. http://en.wikipedia.org/wiki/VHF_omnidirectional_range, May 4, 2005.

(Continued)

*Primary Examiner* — Christopher M Brandt
(74) *Attorney, Agent, or Firm* — Oliff & Berridge, PLC

(57) ABSTRACT

There is provided a method and system for positioning a transponder, the system comprising an antenna array of at least two spaced-apart antennas coupled to a common generating and switching unit. The generating and switching unit is configured for generating a periodic signal and switching the signal between said at least two antennas, constituting a positioning signal transmitted to the transponder. The system comprises a receiver for receiving a returned signal and a phase difference estimator coupled to the receiver and operable to measure phase differences between portions of the returned signal. The system further comprises a positioning utility coupled to said phase difference estimator and configured to determine the position of the transponder relative to the positioning system.

17 Claims, 8 Drawing Sheets

U.S. PATENT DOCUMENTS

| | | | |
|---|---|---|---|
| 3,981,015 | A | 9/1976 | Phipps |
| 4,087,816 | A | 5/1978 | Barszczewski et al. |
| 4,197,542 | A | 4/1980 | Hofgen |
| 4,283,726 | A | 8/1981 | Spence et al. |
| 4,464,662 | A | 8/1984 | Tomasi |
| 4,975,710 | A | 12/1990 | Baghdady |
| 5,084,709 | A | 1/1992 | Baghdady |
| 5,099,245 | A | 3/1992 | Sagey |
| 5,126,513 | A | 6/1992 | Wang et al. |
| 5,883,598 | A | 3/1999 | Parl et al. |
| 6,270,433 | B1 | 8/2001 | Orenstein et al. |
| 6,489,923 | B1* | 12/2002 | Bevan et al. ............ 342/378 |
| 6,573,865 | B1 | 6/2003 | Baghdady |
| 6,700,536 | B1* | 3/2004 | Wiegand ............ 342/417 |
| 6,876,326 | B2 | 4/2005 | Martorana |
| 7,136,660 | B2* | 11/2006 | Farber et al. ............ 455/456.1 |
| 7,260,408 | B2* | 8/2007 | Friday et al. ............ 455/456.1 |
| 2002/0008656 | A1 | 1/2002 | Landt |
| 2002/0102995 | A1* | 8/2002 | Zelmanovich et al. ....... 455/456 |
| 2002/0113709 | A1* | 8/2002 | Helms ............ 340/572.7 |
| 2002/0145563 | A1 | 10/2002 | Kane et al. |
| 2003/0162552 | A1 | 8/2003 | Lehtinen |
| 2004/0198387 | A1 | 10/2004 | Tsuji et al. |
| 2004/0260506 | A1 | 12/2004 | Jones et al. |
| 2005/0062647 | A1 | 3/2005 | Marks |
| 2006/0183488 | A1* | 8/2006 | Billhartz ............ 455/456.5 |
| 2009/0111483 | A1* | 4/2009 | Fiereizen ............ 455/456.1 |
| 2010/0001896 | A1 | 1/2010 | Fiereizen |

FOREIGN PATENT DOCUMENTS

| | | |
|---|---|---|
| WO | WO 86/00716 A1 | 1/1986 |
| WO | WO 01/94974 A2 | 12/2001 |

OTHER PUBLICATIONS

Frank Vizard; Scientific American.com: Safeguarding GPS, Apr. 14, 2003 https://www.sciam.com/print_version.cfm?articleID=00079DD3-DAA0-1E96-8EA5809EC5880000.

Co-pending U.S. Appl. No. 11/989,477, filed Jun. 12, 2008.

Office Action dated Dec. 29, 2010 in U.S. Appl. No. 11/989,477.

Office Action dated Jun. 9, 2011 in U.S. Appl. No. 11/989,477.

Notice of Allowance dated Oct. 14, 2011 in U.S. Appl. No. 11/989,477.

* cited by examiner

SYSTEM AND METHOD FOR ENABLING DETERMINATION OF A POSITION OF A TRANSPONDER

FIELD OF THE INVENTION

This invention relates to transmitting/receiving systems and methods and more specifically, to positioning systems and methods.

BACKGROUND OF THE INVENTION

The following patent publications relate to positioning of transponders: U.S. Pat. No. 6,876,326 discloses a high accuracy search and tracking system that uses a round-trip messaging scheme in which the Time of Arrival (TOA) of ranging signals is accurately determined to yield the range estimates between a target communications device and one or more search communications devices. Successive ranging estimates are used by a search device to home in upon the target device. The physical location pinpoint communications system can be used alone, or in combination with other location estimation systems that can be used initially, or throughout the search and tracking process to pinpoint the physical location of the target device. The search radio(s) transmits ranging signals to the target radio which responds by transmitting reply ranging signals. Upon reception of the reply ranging signal, the search radio determines the range to the reference radio from the signal propagation time. Errors in TOA estimates can be minimized using advanced processing techniques, if required.

U.S. Pat. No. 6,270,433 discloses a system for locating players on a field including first and second directional scanning antennas located adjacent the field. A transponder carried by the players detects the radiation from each antenna and transmits timing signals. The timing signals are received at a central station and compared to reference timing signals synchronized with the scanning of the antennas to provide an indication of the angular position of each player from the scanning antenna locations. The actual field position of the players can then be computed. The system can also locate the position of a playing object, such as a ball.

The following patent publications relate to positioning systems and methods and are not limited to positioning of a transponder: U.S. Pat. No. 3,981,015 discloses a phase comparison radio navigation system in which a prime transmitting station and one or more secondary transmitting stations radiate phase-locked signals of the same frequency in a time-shared sequence. Phase locking at the secondary station or stations is effected by using a common phase comparator both for locking a phase memory oscillator to the receiving prime signals and for locking the secondary signals at the antenna with the phase memory oscillator.

U.S. Pat. No. 4,975,710 discloses methods, algorithms and apparatus for Direction of Arrival (DOA) measurement/computation based on long-baseline, phase-difference, paired-antenna interferometry and on DOA-computing array processing algorithms. Specifically, methods and algorithms based on direct, cyclically unambiguous estimation of the cosine of the DOA are described for resolving the cyclic ambiguities in long-baseline, phase-difference paired-antenna interferometers, and for steering the computations to the vicinities of the solutions in computation-intensive array processing algorithms, thereby reducing computation load and time.

U.S. Pat. No. 4,197,542 discloses an electronic navigation system ground station, which may be either an omni-range beacon (such as VOR) or a passive direction finder. A circular array of antenna elements has a feed arrangement which includes switched programming of at least one discrete set of phase shifters to effect successively changed phase-rotation fields for minimizing the adverse effects of multipath signals between the ground station and a remote station, aboard an aircraft for example.

U.S. Pat. Nos. 6,573,865 and 5,084,709 disclose a multi-element antenna clusters or arrays for the reception and transmission of radio waves for direction-finding, navigation aid and emitter and/or receiver location purposes. In particular, it relates to arrangements of multiple antennas whereby the direction of propagation (arrival or departure) of a wavefront is determined from a combination of the amplitudes of phasor (or total individual antenna output) differences between pairs of antennas, said arrangements being along certain geometrical patterns, such as a circle, an ellipse, a polygon, an open straight line, etc., with at least one longest dimension measuring more than one wavelength of the incident or departing wave.

U.S. Pat. No. 3,967,277 discloses a radio navigation system which includes a first pair of fixed transmitting stations, a second pair of fixed transmitting stations and a mobile station. The mobile station includes a receiver having first means for deriving a first signal indicative of the difference in the distances between the mobile station and each of the first pair of fixed stations and second means for deriving a second signal indicative of the difference in the distances between the mobile station and each of the second pair of fixed stations. Summing means are provided for adding the first and second signals to obtain a third signal indicative of a first line of position on which the mobile station is located, and difference means are provided for subtracting one of the first and second signals from the other to obtain a fourth signal indicative of a second line of position on which the mobile station is located.

There is a need in the art for a positioning system and method that allows the positioning of an object equipped with a transponder and one antenna. There is also a need in the art for a positioning system and method which cannot be easily jammed. There is a further need in the art for a positioning system capable of providing update rate of more than 50-100 Hz.

SUMMARY OF THE INVENTION

According to one embodiment of the invention, there is provided a system for positioning a transponder, the system comprising an antenna array of at least two spaced-apart antennas coupled to a common generating and switching unit, said generating and switching unit is configured for generating a periodic signal and switching the signal between said at least two antennas, constituting a positioning signal transmitted to the transponder; the system comprises a receiver for receiving a returned signal and a phase difference estimator coupled to the receiver and operable to measure phase differences between portions of the returned signal; the system further comprising a positioning utility coupled to said phase difference estimator and configured to determine the position of the transponder relative to the positioning system.

According to one embodiment of the invention, the determination of the position of the transponder includes determination of the orientation of the transponder relative to the positioning system. According to another embodiment, the determination of the position of the transponder includes determination of the range of the transponder relative to the positioning system, based on TOA (Time of Arrival) comparison between the positioning signal transmitted by the system and the signal returned by the transponder. According to yet another embodiment of the invention, the determination of the position of the transponder includes determination of the range of the transponder relative to the positioning system, based on information received from a source external to the system, about the range of the transponder relative to the system. According to yet another embodiment of the invention, the positioning system is further configured, based on the determination of the position of the transponder, to transmit the transponder position related information (e.g. navigation instructions).

According to another embodiment of the invention there is provided a system for determining the orientation of a transponder relative to the system, the system comprising an antenna array of at least two spaced-apart antennas coupled to a common generating and switching unit, said generating and switching unit is configured for generating a periodic signal and switching the signal between said at least two antennas, constituting a positioning signal transmitted to the transponder; the system comprises a receiver for receiving a returned signal and a phase difference estimator coupled to the receiver and operable to measure phase differences between portions of the returned signal; the system further comprising a positioning utility coupled to said phase difference estimator and configured to determine the orientation of the transponder relative to the position of the system.

According to another embodiment of the invention, there is provided a method for positioning a transponder, the method comprising:

generating a periodic signal and switching the periodic signal between an antenna array of at least two spaced-apart antennas of known locations coupled to a common generating and switching unit;

transmitting the signal to the transponder and receiving a returned signal;

based on measurements of phase differences between portions of the returned signal, determining the orientation of the transponder relative to the system, thereby allowing the determination of the position of the receiver relative to the positioning system.

BRIEF DESCRIPTION OF THE DRAWINGS

In order to understand the invention and to see how it may be carried out in practice, specific embodiments will now be described, by way of non-limiting example only, with reference to the accompanying drawings, in which.

DETAILED DESCRIPTION OF SPECIFIC EMBODIMENTS OF THE INVENTION

Figure 1:
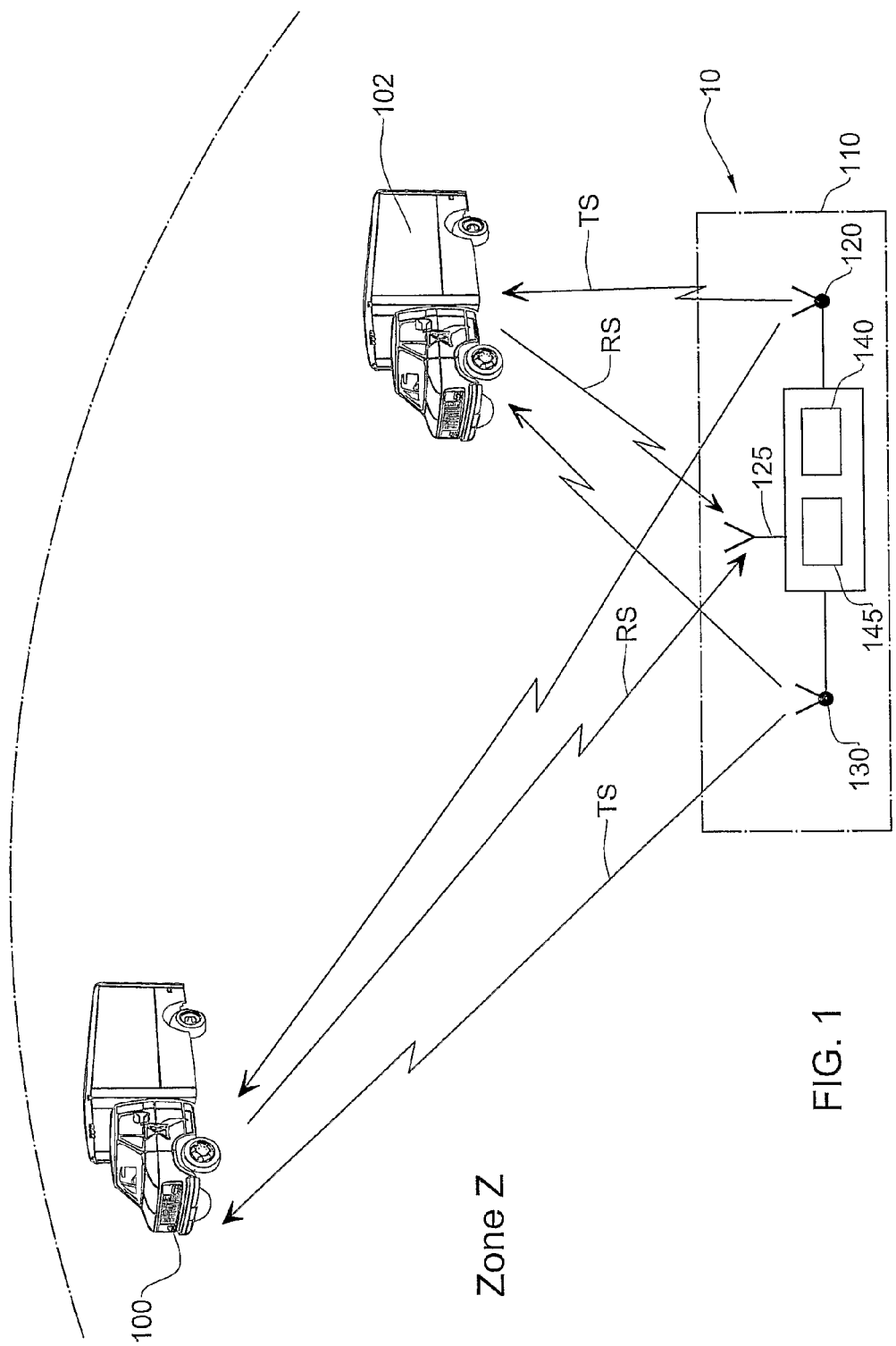
FIG. 1 is a schematic illustration of a simplified architecture of a positioning system according to an embodiment of the invention.

FIG. 1 is a schematic illustration of a simplified architecture of a positioning system 10 according to an embodiment of the invention. The positioning system 10 includes a base station 110 of a known position, having an array of two spaced-apart RF transmit antennas 120 and 130, and a common generating and switching unit 140 coupled to the antennas. System 10 further comprises a receive antenna 125 and a time and phase difference estimator 145. System 10 radiates (transmits) a positioning signal TS, which can be received at a certain local zone Z. An object 100 of an unknown position (a ground platform in this non-limiting example), equipped with an RF receiver/transmitter (transponder) and one antenna (not shown in FIG. 1), receives signal TS and returns it (signal RS) to the base station 140, through receive antenna 125. The returned signal RS carries information about the relative position of the object 100 with respect to the base station 140. The returned signal is analyzed for the purpose of positioning the transponder. Also shown in FIG. 1 is another object 102 (another ground vehicle) travelling within zone Z, receiving positioning signal TS from base station 140 and returning a signal that carries information about the position of vehicle 102.

Positioning Signal TS is a periodic signal (e.g. a 1 GHz sinusoidal signal) generated by unit 140 and switched between antenna 120 and antenna 130. In other words, signal TS includes signal portions emitted by antenna 120 which alternates with signal portions emitted by antenna 130 (see discussion below referring to FIGS. 5-6). The returned signal RS carries information about the orientation and the ranging of the object 100 relative to the base station: Using the time and phase difference estimator for estimating the frequency and phase of the received signal, the base station is able to estimate the phase differences $\phi$ between portions of the positioning signal emitted by antennas 120 and 130 as received by the object 100. Phase differences detected at one point within zone Z (e.g., by object 100) differ from those detected at another point (e.g., by object 102), and correspond to the geometrical disposition of the receiver relative to antennas 120 and 130. Using time and phase difference estimator for estimating the time delay between the transmitted signal TS and the returned signal RS, the base station is able to determine the range to the object.

The concept of the present invention, according to certain embodiments, will now be explained in greater detail with reference to FIGS. 2-3 and FIGS. 4a-4c, in which the same elements are marked by the same reference numbers. Reverting now to FIG. 2, there is presented another illustration of the positioning system 10, showing the geometrical disposition of the positioning system operating in zone Z (zone Z is not shown in FIG. 2) and an object 100 located within zone Z.

The portions of signal TS that are emitted by antenna 120 travels a slant distance $R_1$, which is longer by $\Delta R$ comparing those portions emitted by antenna 130, that travel a distance $R_2$.

Figure 2:
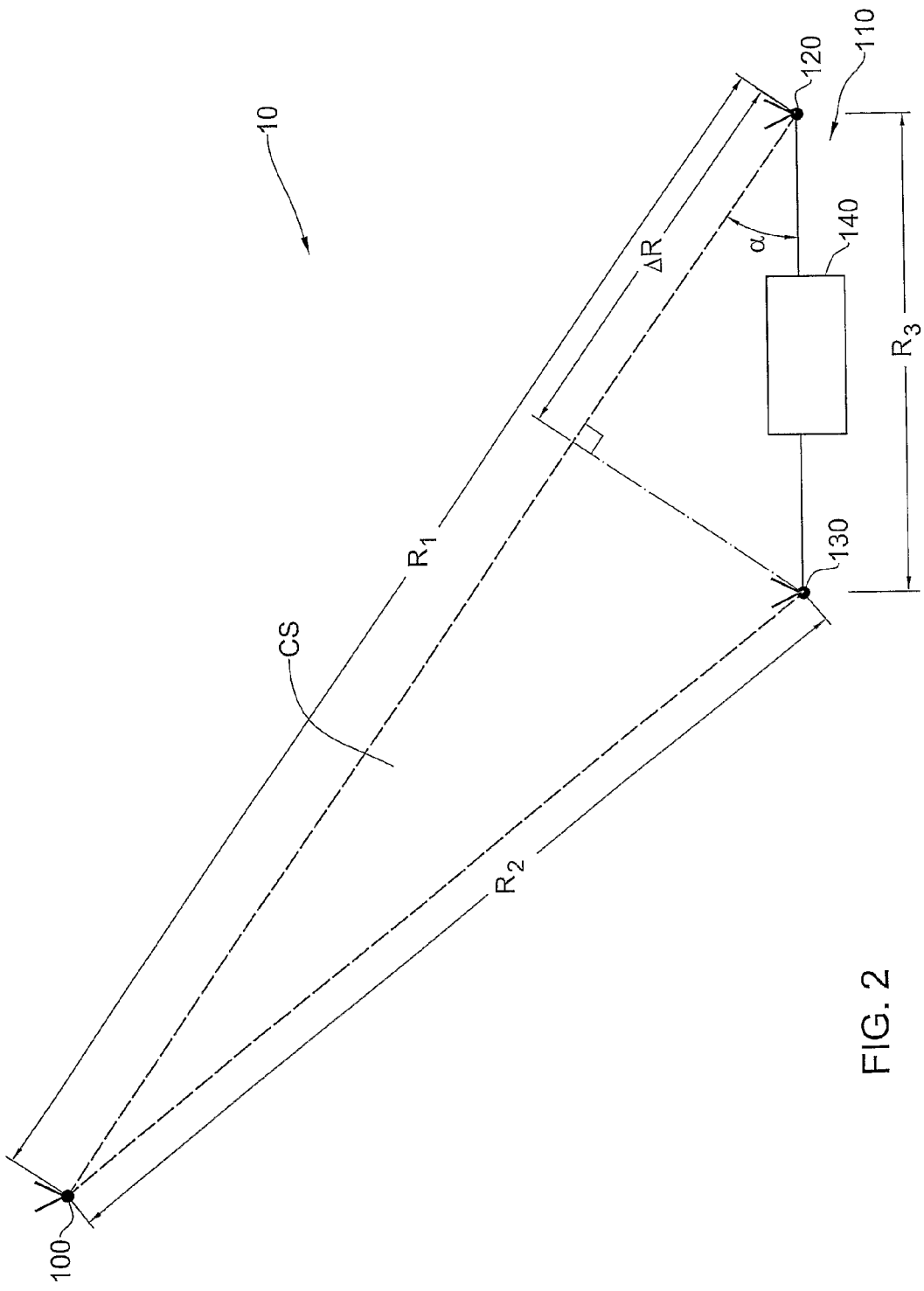
FIG. 2 is another illustration of the positioning system according to the embodiment of the invention shown in FIG. 1.

By measuring f and $\phi$, $\Delta R$ could be determined using the following known relations (1) and (2):

$$2\pi N + \phi = 2\pi f \Delta t \quad (1)$$

$$\Delta R = c \Delta t \quad (2)$$

therefore, $$\Delta R = c(2\pi N + \phi)/2\pi f \quad (3)$$

wherein:

f is the frequency of signal TS;

$\phi$ is the phase difference between portions of the positioning signal transmitted by antennas 120 and 130, as detected at point 100 (see also FIG. 3 and text below);

$\Delta t$ is the time delay between portions of the positioning signal emitted by the spaced-apart antennas 120 and 130, as received at point 100 (note that for simplicity, a delay D that characterized the operation of the phase difference estimator, and is a predefined and known parameter, is not included in relation (1));

N is an integer indicating the number of cycles of signal TS along $\Delta R$ (for simplicity, the discussion relating to FIG. 2 will continue based on the assumption that N is known. The ambiguity of N is discussed further below, with reference to FIG. 5); and c is the speed of light.

As the distance $R_3$ between antennas 120 and 130 is known, and assuming that N is also known (solving of the ambiguity relating to N is discussed below with reference to FIG. 5), it is now possible to calculate spatial angle $\alpha$, as follows:

$$\cos \alpha = \Delta R / R_3 \quad (4)$$

Thus, by measuring parameters f and $\phi$ which characterized a signal TS transmitted from known points (points 120 and 130) in a switched manner as described above, as received at an unknown point (e.g. point 100 shown in FIGS. 1 and 2), a surface CS is defined, which is the surface of a cone generated by angle $\alpha$, onto which points 100, 120 and 130 are located. This provides information indicating the orientation of point 100 relative to points 120 and 130. The orientation of point 100 relative to points 120 and 130 could be determined using additional information, e.g. information gathered in a manner detailed below with reference to FIG. 3, or elimination procedures known per-se in the field of interferometry (including, but not limited to the use of the assumed or measured height of point 100).

Figure 3:
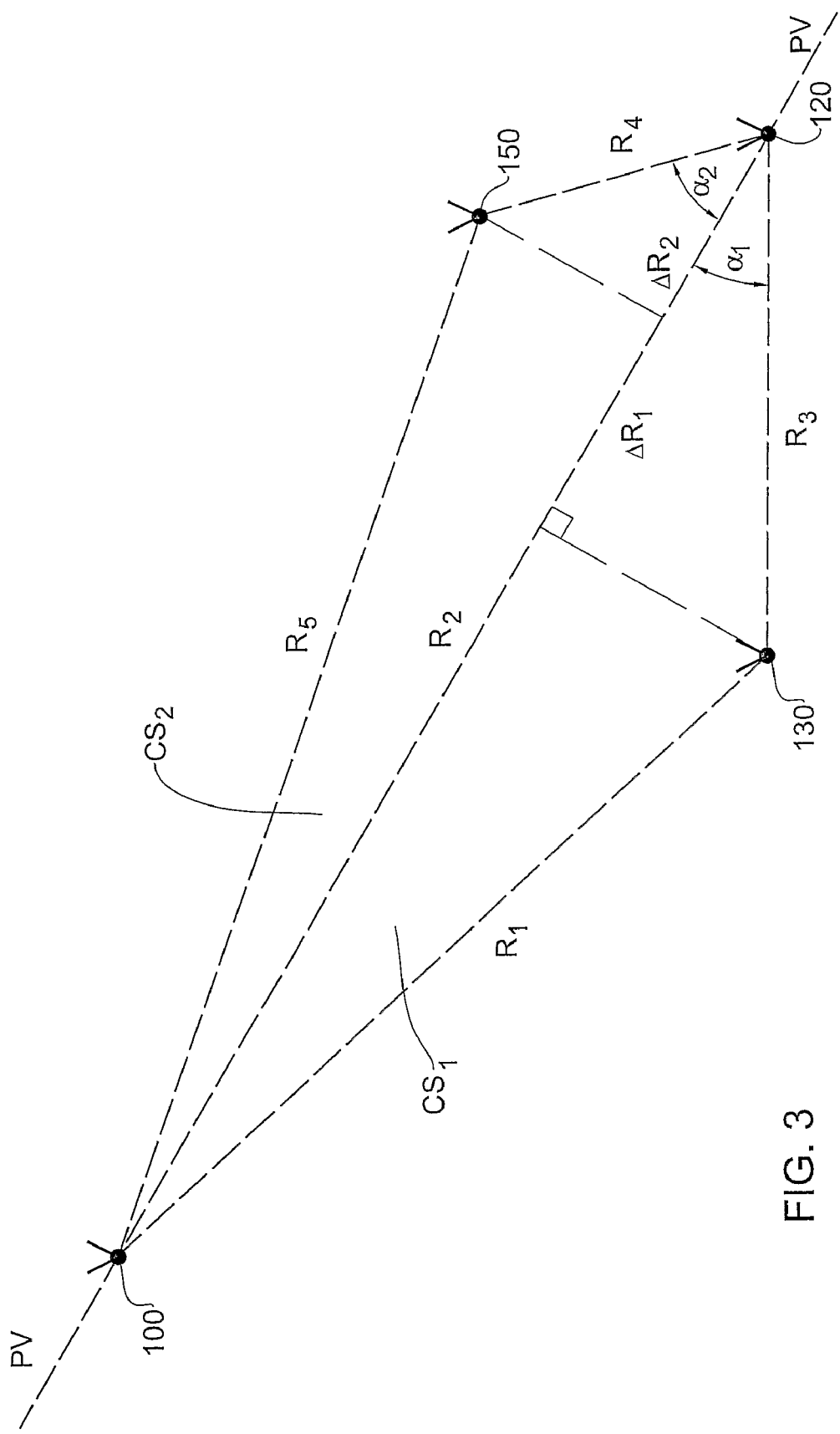
FIG. 3 is a simplified architecture of a positioning system according to another embodiment of the invention.

Turning now to FIG. 3, there is illustrated the geometric disposition of a point 100 relative to a positioning system according to another embodiment of the invention, in which a system 110 further includes a third antenna 150, located at a distance $R_4$ away from antenna 120. According to this embodiment, signal TS is generated by the common unit 140 and switched between the three spaced-apart antennas 120, 130 and 150. In other words, the positioning signal TS includes signal portions that are alternately transmitted by antennas 120, 130 and 150.

In a manner similar to the one described above with reference to FIGS. 1 and 2, two spatial angles, $\alpha_1$ and $\alpha_2$ are determined: $\alpha_1$ is determined with respect to antennas 120, 130 and 100; and $\alpha_2$ is determined with respect to antennas 120, 150 (the other antenna) and 100. Consequently, two Surfaces, $CS_1$ (representing the surface of a cone onto which points 100, 120 and 130 are located) and $CS_2$ (representing the surface of a cone onto which points 100, 120 and 150 are located) are defined. $CS_1$ and $CS_2$ intersect with each other, and the intersection line represents the pointing vector PV (orientation) between antenna 120 and the unknown point 100. In other words, by measuring parameters f and $\phi$ of the returned signal, which indicate the phase differences between portions of the positioning signal as received by the transponder, the orientation of the transponder could be determined.

To summarize the discussion above relating to FIGS. 2-3: the positioning signal TS, transmitted by the base station 140 (switched between antennas 120 and 130), as picked up at point 100, carries information about the direction of point 100 relative to the base station. Object 100 is configured to return the positioning signal (signal RS) to the base station and therefore the position information carried by signal RS is now available to the base station, allowing it to determine the orientation of the object relative thereto. In order to simplify uplink/downlink signal analysis, RS may have a different frequency than signal TS. Additionally, according to TOA/DTOA (Time of Arrival/Time Difference of Arrival) methods known per-se, the range of point 100 relative to the base station could be determined by comparing signal TS to signal RS.

Figure 4A:
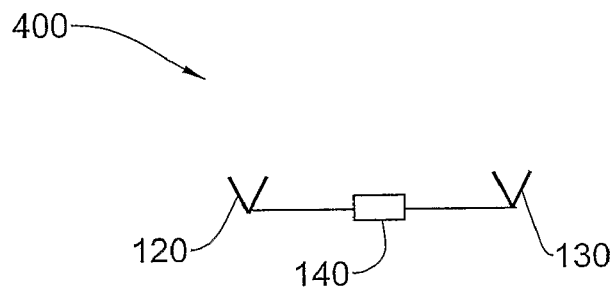
FIGS. 4a-4c schematically illustrate antenna array configurations according to various embodiments of the invention.
Figure 4B:
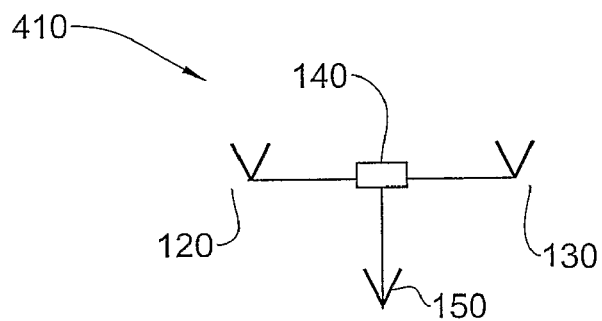
Figure 4C:
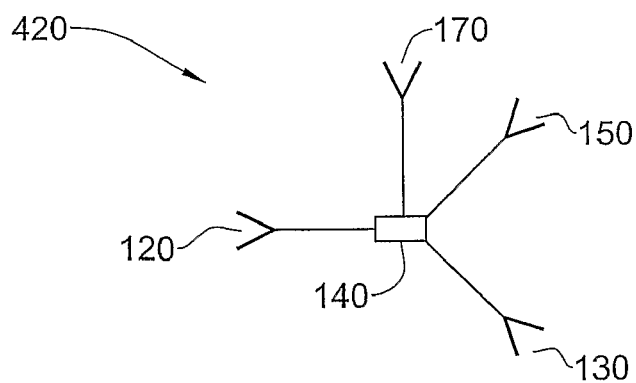

FIGS. 4a-4c schematically illustrate antenna array configurations according to various embodiments of the invention. FIG. 4a schematically illustrates an antenna array 400 according to the embodiment of the invention illustrated in FIG. 2. The antenna array 400 comprises two spaced-apart transmit antennas, (namely antennas 120 and 130, shown in FIG. 2). Antennas 120 and 130 are coupled to a common signal generating and switching unit 140. Unit 140 generates a periodic signal (e.g. a sinusoidal signal) and switches the signal between antennas 120 and 130. The antennas are coupled to the switching unit 140 via substantially identical feed lines (note that non-identical feed lines could also be used, with appropriate means for compensation for consequent delays), such that the output of unit 140 feeds the antennas in a switched manner, thereby giving rise to a positioning signal which includes portions of signal transmitted alternately from the antennas.

The configuration shown in FIG. 4a allows for the determination of the orientation of point 100 relative to the positioning system in two dimensions only. This is most suitable for planar applications (e.g. when object 100, shown in FIG. 1, travels a substantially planar path). If the altitude of object 100 is known. e.g. using other devices (e.g. an altimeter), then its three-dimensional orientation could be defined in a manner known per-se using the determination of the pointing vector PV between the platform and antenna 120 (shown in FIG. 2), in combination with the readings of the altimeter at point 100.

An antenna array 410 according to another embodiment of the invention is shown in FIG. 4b. Array 410 comprises three antennas, 120, 130 and 150 which are coupled to a common generating and switching unit 145. This configuration relates to the embodiment of the invention shown in FIG. 3, which allows the determination of the orientation of the object (pointing vector PV) in three dimensions.

Another antenna array 420 according to yet another embodiment of the invention, is illustrated in FIG. 4c. Array 420 comprises four antennas (120, 130, 150 and 170), coupled to a common generating and switching unit 145. The antenna array 420 is arranged in a tetrahedron form, in which antennas 120, 130 and 150 are located onto the same plane, and antenna 170 is located outside that plane. Note that the three-dimensional arrangement of the antenna array affect the directivity and shape of Zone Z (the zone in which the positioning signal TS can be received). In case full symmetry is substantially maintained, (i.e. an antenna arrangement of a tetrahedron form) the resultant positioning system is substantially omni-directional. Note that the discussion above relating to FIGS. 4a-4c focuses in the antenna array for transmission. For receiving the returned signal, another antenna (e.g. element 125 shown in FIG. 1) could be dedicated, or be integrated with at least one of the transmit antennas.

As noted above with reference to FIG. 2, for simplicity, the discussion above did not include discussion regarding the ambiguity relating to the determination of parameter N, indicating the integer number of cycles of signal TS along ΔR. There are known in the art, several methods for solving the ambiguity of N and the invention is not limited to any one of them. According to an embodiment of the invention, the ambiguity of N is solved in the following manner, discussed with reference to FIGS. 5 and 6 together with FIG. 2:

In order to determine N, the positioning signal TS may include signal portions having a first frequency $f_1$, and signal portions having a second frequency, $f_2$. The signal portions having the frequency $f_1$ are switched between, and emitted by all the antennas at the antenna array (two antennas 120 and 130 in the example shown in FIG. 2), as well as those having the frequency $f_2$. Therefore, a first phase difference $\phi_1$ corresponding to the first frequency $f_1$, and a second phase difference $\phi_2$, corresponding to the second frequency $f_2$, could be measured. The difference between the detected values of $\phi_1$ and $\phi_2$ is used for determining N, in the following manner:

Frequencies $f_1$ and $f_2$ are selected such that $N_1$ and $N_2$, indicating the integer number of cycles of signal TS along ΔR, will follow the relation:

$$N_1 = N_2 + k, \text{ wherein } k \text{ is an integer having law values from a limited set of values (e.g. 1, 2, ... n)} \quad (5)$$

For example, if $f_1$=1 GHz and $f_2$=1.1 Ghz, then k would have a value from a predefined and limited set of values, e.g. k=1, 2 or 3. Note that k>0 if $f_1$<$f_2$.

According to the known relation (1) $2\pi N+\phi=2\pi f \Delta t$ and by dividing:

$$(2\pi N_1+\phi_1)/(2\pi N_2+\phi_2)=2\pi f_1 \Delta t/2\pi f_2 \Delta t \quad (6)$$

and following simple arithmetic procedures, $N_1(k)$ is determined as:

$$N_1(k)=(f_1\phi_1+f_2\phi_2)/2\pi(f_2-f_1)+f_1 k/(f_2-f_1) \quad (7)$$

Using relation (7) with the measured values of $f_1$, $f_2$, $\phi_1$ and $\phi_2$ together with the predefined and limited set of values for k (e.g. k=1, 2 or 3), $N_1$ is determined as the optimal solution of relation (7) (e.g. when the minimum of a trunc$N_1$ or (1−trunc$N_1$) is achieved). In other words, in order to solve the ambiguity of N, the periodic signal includes two frequencies of a predefined difference (e.g. 1 MHz); the predefined difference gives rise to a limited set of values for k, and therefore the value of N could easily be determined by measuring parameters f and $\phi$ of signal portions of both frequencies (that is, $f_1$, $f_2$, $\phi_1$ and $\phi_2$).

Figure 5:
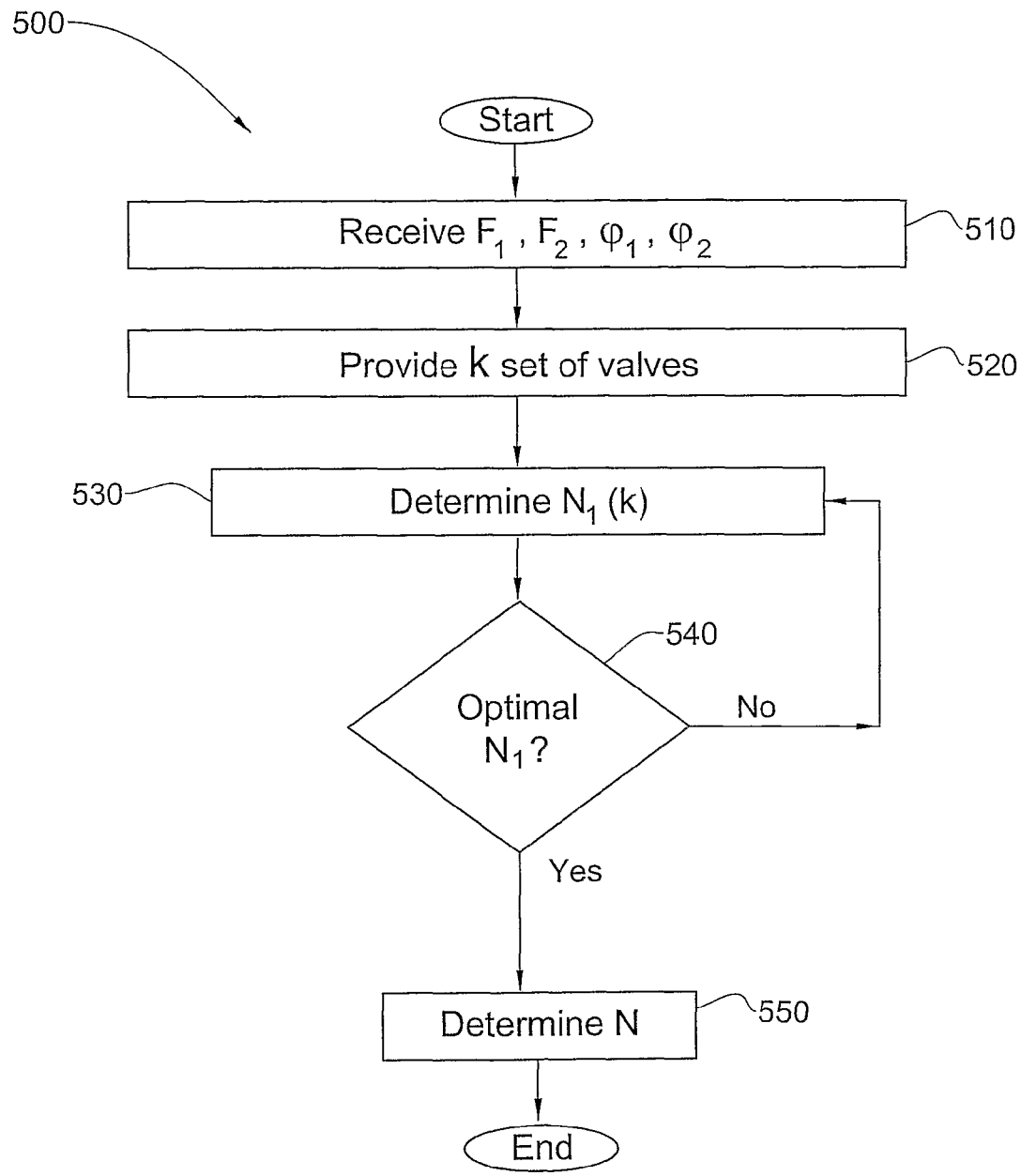
FIG. 5 is a flow chart showing a sequence of operations carried out by a receiver receiving a positioning signal transmitted in accordance with one embodiment of the invention.

FIG. 5 is a flow chart showing a sequence of operations 500 carried out for the determination of parameter N:

In operation 510: receive measured parameters $f_1$, $f_2$, $\phi_1$ and $\phi_2$;

In operation 520: provide a set of values for parameter k. for example, k could be provided from a reference table according to the difference between $f_1$ and $f_2$ (e.g., for a 100 MHz difference, the set of values for k includes the values 1, 2 and 3);

In operation 530: the set of values of $N_1(k)$ is determined, using relation (7) above for the various values of k provided at operation 520;

In operation 540, the optimal $N_1(k)$ is selected, and

In operation 550, the selected $N_1(k)$ is determined as parameter N.

Figure 6:
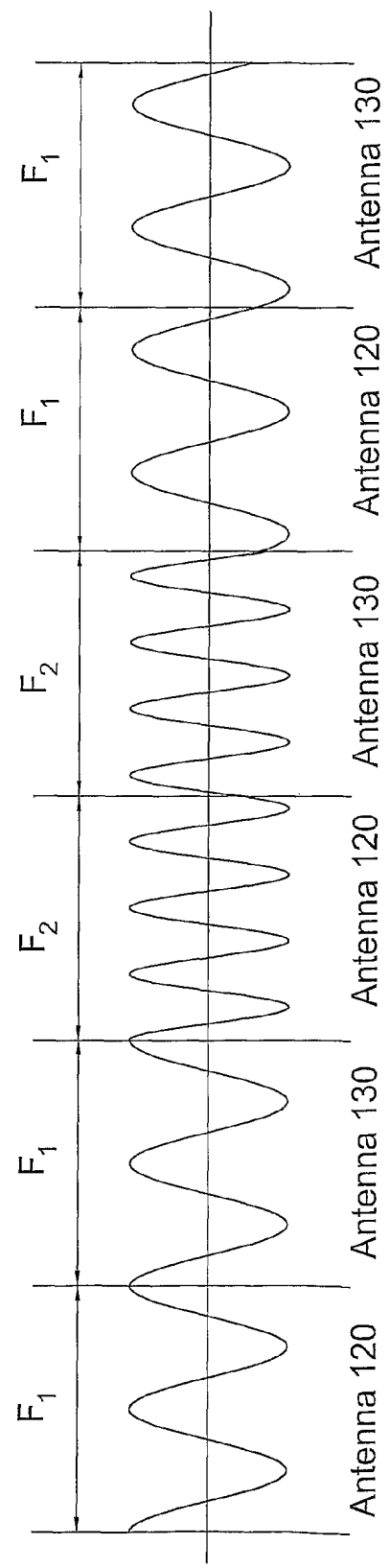
FIG. 6 illustrates a signal generated by a positioning system according to an embodiment of the invention.

Following the above description regarding the definition of parameter N, it should be noted that the positioning signal TS as discussed above with reference to FIGS. 1-3 and 4a-4c, may include signal portions having a first frequency $f_1$, and signal portions having a second frequency, $f_2$. A schematic illustration of a positioning signal TS as generated, for example, by the positioning system 410 shown in FIG. 4b, is illustrated in FIG. 6: The signal portions having the frequency $f_1$ are switched between and emitted by all the antennas at the antenna array, as well as those having the frequency $f_2$.

It should be noted that the portions transmitted by one antenna need not be identical in length to those transmitted by the other antenna/s. The timing and duration of the switching of the signal between the transmitting antennas can be changed along the transmission of the positioning signal. Furthermore, there is no need to sequence $f_2$ portions after each $f_1$ portion of signal, and other combinations are possible. Furthermore, additional signal portions carrying additional information (e.g. the identity of the base station, and more) could be embedded in the periodic signal. The periodic signal needs to be transmitted while being alternately switched between the antennas, thereby constituting the positioning signal.

It should be understood that the phase difference between portions of positioning signal alternately transmitted by the different antennas (according to the various architectures as described above), is affected by the geometrical arrangement of the antennas. Furthermore, the phase difference detected for positioning is derived by comparing a portion of the returned positioning signal RS with a delayed portion of the same returned positioning signal.

Figure 7:
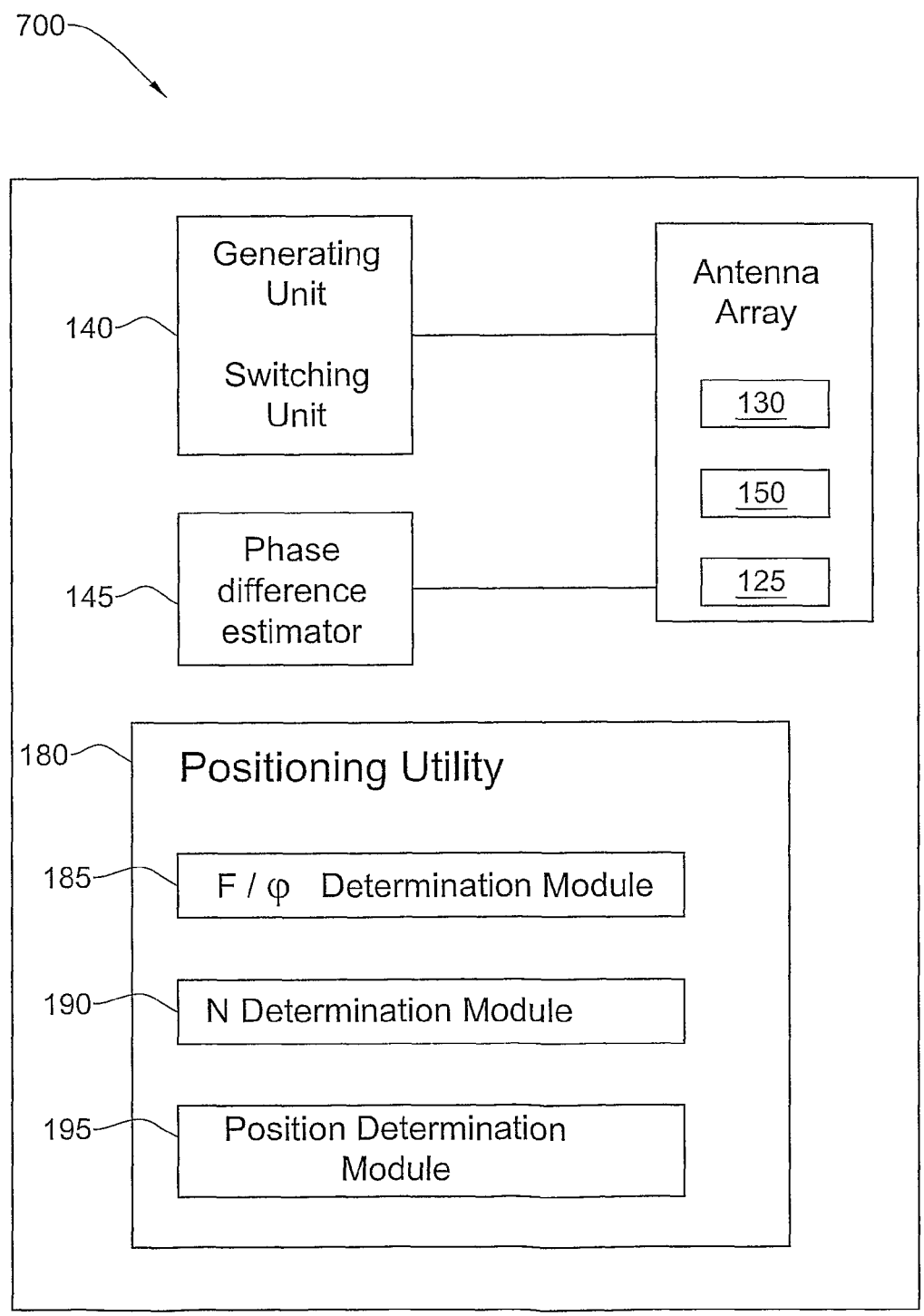
FIG. 7 is a block diagram showing a positioning system according to one embodiment of the invention.

FIG. 7 is a block diagram showing a positioning system 700 according to one embodiment of the invention. For simplicity, system 700 is presented as having a 'transmit' part—comprising an antenna array (e.g. antenna array of two antennas 120 and 130, as shown in FIG. 4a) and a common generating and switching unit 140, all responsible for the transmission of the positioning signal TS; and a 'receive' part—comprising a receive antenna 125, a time and phase difference estimator 145 and a positioning utility 180, which is a processing hardware/software utility, responsible for receiving and analyzing the returned positioning signal RS.

The phase difference estimator 145 can be realized based on any devices and methods known in the art for estimating phase differences. For example, phase difference estimator 145 may include a digital comparator for comparing a currently received portion of signal with a previously received portion of the same signal (a portion fed via a delay component, e.g. a FIFO (First In First Out) buffer providing a 0.5 μsec. delay). For example, the phase difference estimator 145 can be realized based on a Modulation-on-Pulse device, known in the art.

Positioning utility 180 comprises, inter-alia, an f/$\phi$ determination module 185 for determining the frequency f and phase $\phi$ of various portions of the received signal, N determination module 190 for determination of parameter N (see discussion above with reference to FIG. 5), and position determination module 195 for calculating the position of the transponder. Not shown in FIG. 7 are Analog-to Digital converters, which may be required. Positioning system 700 could also comprise a ranging utility (not shown in FIG. 7) operable for determining the range of the transponder relative to the system based on TOA/DTOA measurements and comparisons of the transmitted and returned signals, or for receiving range information from an external source (e.g. external unit performing TOA/DTOA analysis). Position determination module 195 may also be configured for determining the position of the transponder based on the orientation and range of the transponder relative to the system.

It should be noted that the receive antenna 125 could be integrated with one of the transmit antennas. Furthermore, all elements could be integrated to form a positioning device compact in size and weight. In addition, the operation of the generating and switching unit 145 could be controlled by the processing utility 180. System 700 is illustrated in FIG. 7 in a non-limiting manner as a stand-alone system. However, it should be understood that the system can be integrated with additional hardware and software without departing from the scope of the invention. For example, according to one embodiment, the positioning system is integrated with a system for providing the object to be positioned with position-based information, e.g. navigation information.

Figure 8:
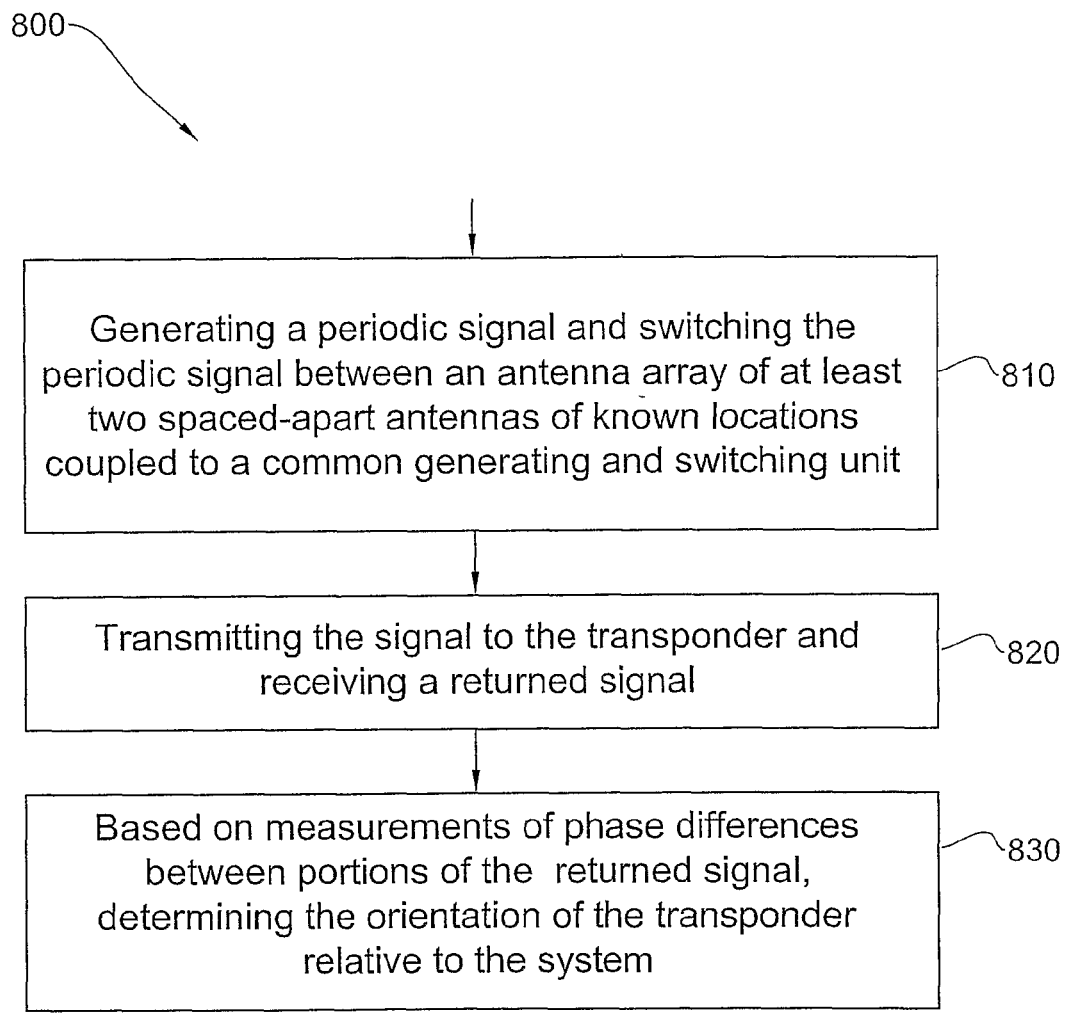
FIG. 8 is a flow chart showing a sequence of operations carried out by a positioning system according to an embodiment of the invention.

FIG. 8 illustrates a positioning method according to an embodiment of the invention, showing a sequence of operations 800 carried out by a positioning system in order to determine the position of an unknown transponder. The positioning method comprises the following operation:

In operation 810:

Generating a periodic signal and switching the periodic signal between at least two spaced-apart antennas of known locations coupled to a common generating and switching unit. The periodic signal may include one frequency (parameter f as discussed with reference to FIGS. 2 and 3), or may have portions having a first frequency and portions having a second frequency (parameters $f_1$ and $f_2$, as discussed above with reference to FIGS. 5 and 6).

In operation 820:

Transmitting the signal to the transponder and receiving a returned signal. As detailed above, the transponder receives a positioning signal that has portions of signal transmitted alternately by each of the spaced-apart antennas (two, three or more, as the case may be). The transponder returns the signal at the same—or at a different frequency, and the return signal carries phase differences between portions of signal transmitted by different antennas as received by the transponder (this is discussed above mainly with reference to FIG. 2).

In case the periodic signal includes two frequencies (or more) such that portions having the same frequency are switched between the antennas, the positioning signal transmitted to the transponder includes portions of the first frequency alternately transmitted by all of the antennas, and portions of the second frequency alternately transmitted by all of the antennas (this is illustrated in FIG. 6). The returned signal, therefore, carries phase differences corresponding to the first and second frequencies.

In operation 830:

Based on measurements of phase differences between portions of the returned signal, determining the orientation of the transponder relative to the system. The phase difference estimator (element 145 shown in FIG. 7) measures the above mentioned phase differences (parameters f and φ—or $f_1$, $f_2$, $\phi_1$, $\phi_2$ are measured, as discussed with reference to FIGS. 2, 3, 5 and 6). The positioning utility (element 180 shown in FIG. 7) determines the orientation of the transponder relative to the system. In case information about the range of the transponder relative to the positioning system is available (e.g. by TOA/DTOA comparison of the transmitted signal and returned signal, or from an external source), the position of the transponder can be easily determined based on methods known per-se.

Sequence of operations 800 may also comprise one or all of the following operations:

based on TOA (Time of Arrival) comparison between the signal transmitted by the system and the signal returned by the transponder, determining the range of the transponder relative to the positioning system.

receiving from an external source information about the range of the transponder relative to the positioning system, and determining the position of the transponder.

comparing the position of the transponder with position information of the position of the transponder established using PGS (Global Positioning System) and/or INS (Inertial Navigation System) systems, thereby allowing assessing the accuracy of said position information.

The invention was described mainly with reference to a ground platform. It should be noted that the invention is also applicable for airborne and sea-borne vehicles, with the required alterations and modifications. The invention could also be realized as a hand-held mobile device.

The present invention could be integrated with a cellular communication network, e.g. for supporting geographically-based services. Typically, a cellular communication network is formed as a grid of cells covering a service area. In each cell there are provided network components (e.g. cell site or base station, including transmitting/receiving equipment), serving the mobile communication devices currently located within the cell and communicating with other network components (e.g. other cell sites, central components, etc.). Each mobile communication device communicates in a timely manner with its cell site, receiving and returning a control signal, thereby providing the network with information indicating the current range between the mobile device and the serving cell site. However, typically the specific position (orientation) of the mobile device within a cell is unknown to the network. For example, as is clear, in light of the detailed discussion above, by proving a cell site having two antennas and switching the control signal therebetween, information about the direction of the mobile device relative to the cell site can be established.

The present invention could be integrated with other positioning systems (e.g. GPS (Global Positioning system) or INS (Inertial Navigation System), in order to validate the readings of those other positioning systems and assess their accuracy. For example, by comparing the position of an object determined according to the invention with a GPS-based position, it is possible to determine if the GPS signal is jammed or deceived. By providing accurate positioning information, the present invention could also be used for correlating timed information between different and remote systems, and for calibrating INS devices.

The positioning system, according to the various configurations described above, provides high precision position measurements. The precision is affected by the range of frequencies, and it is clear that at higher frequencies, better precision is yielded. However, in order to provide greater system range, lower frequencies are required. Note that while at the frequency range of about 1 GHz, Line of Site (LOS) transmission is required; this limitation is decreased at lower frequencies. The precision is further affected by the geometry of the array of the antennas which are coupled to a common switch. Additional precision is achieved by averaging phase measurements over a period of time (e.g. over 1 msec.). System errors are minimal as there is no need to compensate for receiver errors and to correlate readings from different receivers.

The positioning system, according to the various configurations described above, provides high update rate. The update rate is affected by the width of the periodic signal as well as by the length of the switching cycle (i.e. the length of time needed for transmission of the periodic signal by all antennas in the antenna array). For example, by setting the width of a 1 GHz periodic signal to 1 msec, and the length of the switching cycle to 4 msec, a 100 KHz update rate is maintained. Note that high update rate provides better navigation precision and better signal-to-noise ratio, and consequently, larger coverage area.

The positioning system according to the present invention is better protected against jamming. The positioning signal available to transponders located within the coverage area of the positioning system is stronger than the GPS signal available in most areas covered by the GPS system, and therefore stronger signal is required for jamming.

The invention was described with reference to RF radiation, and mainly to RF radiation of frequencies of about 1 Ghz. It should be noted that the invention is not limited by the exemplified frequencies, and could be employed along other portions of the radio spectrum as well as other electromagnetic radiation spectra. Furthermore, the invention is not limited to electromagnetic radiation and is applicable to any other form of propagating wave-borne energy, such as acoustic, ultrasonic, etc.

For simplicity, the positioning systems, according to various embodiments of the invention, were described as stand-alone systems. It should be noted that a positioning system, according to the invention, could be integrated with other systems, e.g. other positioning systems, direction-finders, radar systems and many more, with the required alterations and modifications.

The invention claimed is:

1. A system for positioning a transponder, comprising:
an antenna array of at least two spaced-apart antennas coupled to a common generating and switching unit, the common generating and switching unit being configured to generate a periodic signal (TS) and to switch the periodic signal between the at least two spaced-apart antennas, the periodic signal constituting a positioning signal transmitted to the transponder;
a receiver for receiving a returned signal (RS) from the transponder;
a phase difference estimator coupled to the receiver and operable to measure phase differences between portions of the returned signal, the portions being separated by a time delay and having a same single frequency, wherein each portion is transmitted by a different antenna of the at least two spaced-apart antennas; and
a positioning utility coupled to the phase difference estimator and configured to determine a position of the transponder relative to the positioning system based on the measurement of the phase differences.

2. A system according to claim 1 wherein the determination of the position of the transponder includes determination of a range of the transponder relative to the positioning system, based on TOA (Time of Arrival) comparison between the positioning signal transmitted by the system and the returned signal from the transponder.

3. A system according to claim 1 wherein the determination of the position of the transponder includes determination of a range of the transponder relative to the positioning system, based on information received from a source external to the system, about the range of the transponder relative to the system.

4. A system according to claim 1, wherein the at least two spaced-apart antennas are coupled to the common generating and switching unit via substantially identical feed lines.

5. A system according to claim 1, wherein the antenna array comprises four antennas spaced apart in a tetrahedron form.

6. A system according to claim 1 further configured, based on the determination of the position of the transponder, to transmit transponder position related information.

7. A system according to claim 1 wherein the antenna array includes at least three spaced-apart antennas.

8. A system according to claim 1 wherein the common generating and switching unit is operable to generate the periodic signal as including signal parts of at least a first frequency and a second frequency, and to switch the periodic signal between the at least two spaced-apart antennas such that signal parts of the first frequency are switched between the at least two spaced-apart antennas and are followed by signal parts of the second frequency, which are switched between the at least two spaced-apart antennas.

9. A system according to claim 8 wherein the first frequency is in a range of about 1 GHz or more and the second frequency differs from the first frequency by about 1 MHz.

10. A method for positioning a transponder, comprising:
generating a periodic signal and switching the periodic signal between at least two spaced-apart antennas of an antenna array of known locations coupled to a common generating and switching unit;
transmitting the periodic signal to the transponder and receiving a returned signal from the transponder;
measuring phase differences between portions of the returned signal, the portions being separated by a time delay and having a same single frequency, wherein each portion is transmitted by a different antenna of the at least two spaced-apart antennas; and
determining a position of the transponder relative to the system based on the measurement of the phase differences.

11. The method according to claim 10 further comprising:
determining a range of the transponder relative to the positioning system based on TOA (Time of Arrival) comparison between the periodic signal transmitted by the system and the returned signal from the transponder.

12. The method according to claim 10 further comprising:
receiving from an external source information about a range of the transponder relative to the positioning system, and determining the position of the transponder based on the information.

13. A method according to claim 10 further comprising:
comparing the position of the transponder with position information of the position of the transponder established using GPS (Global Positioning System) and/or INS (Inertial Navigation System) systems; and
assessing an accuracy of the position information.

14. A method according to claim 10 wherein the antenna array comprises four antennas spaced apart in a tetrahedron form.

15. A method according to claim 10 wherein the generating the periodic signal includes generating signal parts of at least a first frequency and a second frequency, and switching the periodic signal between the at least two spaced-apart antennas such that signal parts of the first frequency are switched between the at least two spaced-apart antennas and are followed by signal parts of the second frequency, which are switched between the at least two spaced-apart antennas.

16. A method according to claim 10 wherein the antenna array comprises three spaced-apart antennas.

17. A method according to claim 15, wherein the first frequency is in a range of about 1 GHz or more and the second frequency differs from the first frequency by about 1 MHz.

* * * * *